US008527583B2

(12) United States Patent
Kawabata

(10) Patent No.: US 8,527,583 B2
(45) Date of Patent: Sep. 3, 2013

(54) COMMUNICATION DEVICE INCLUDING A COMMUNICATION START REQUEST OUTPUT UNIT AND A RESPONSE NOTIFICATION ACCEPTANCE UNIT, COMMUNICATION SYSTEM, AND COMPUTER-READABLE MEDIUM

(75) Inventor: Hirotaka Kawabata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 183 days.

(21) Appl. No.: 13/041,472

(22) Filed: Mar. 7, 2011

(65) Prior Publication Data

US 2012/0072603 A1   Mar. 22, 2012

(30) Foreign Application Priority Data

Sep. 17, 2010 (JP) ................................. 2010-209906

(51) Int. Cl.
*G06F 15/16* (2006.01)
(52) U.S. Cl.
USPC ............ 709/203; 709/228; 370/466; 370/524
(58) Field of Classification Search
USPC .................. 709/228, 203; 370/524, 228, 466
See application file for complete search history.

(56) References Cited

U.S. PATENT DOCUMENTS 6,891,861 B1 *   5/2005   Odaira ........................... 370/524
6,970,905 B2 *  11/2005   Jeffery et al. .................. 709/203

FOREIGN PATENT DOCUMENTS

| EP | 0600466 B1 | 4/2001 |
| JP | 02-174347 A | 7/1990 |
| JP | 06-178011 A | 6/1994 |
| JP | 2000-244677 A | 9/2000 |

* cited by examiner

Primary Examiner — Kyung H Shin
(74) Attorney, Agent, or Firm — Sughrue Mion, PLLC

(57) ABSTRACT

A communication device includes a communication start request output unit and a response notification acceptance unit. The communication start request output unit outputs a communication start request to an output destination communication device. The response notification acceptance unit accepts a response notification with respect to the communication start request from the output destination communication device. When the response notification acceptance unit accepts a response notification indicating connection rejection due to a mismatch of a communication standard as the response notification with respect to the output communication start request, the communication start request output unit again outputs the communication start request to the output destination communication device in the communication standard to which the output communication start request conforms.

6 Claims, 7 Drawing Sheets

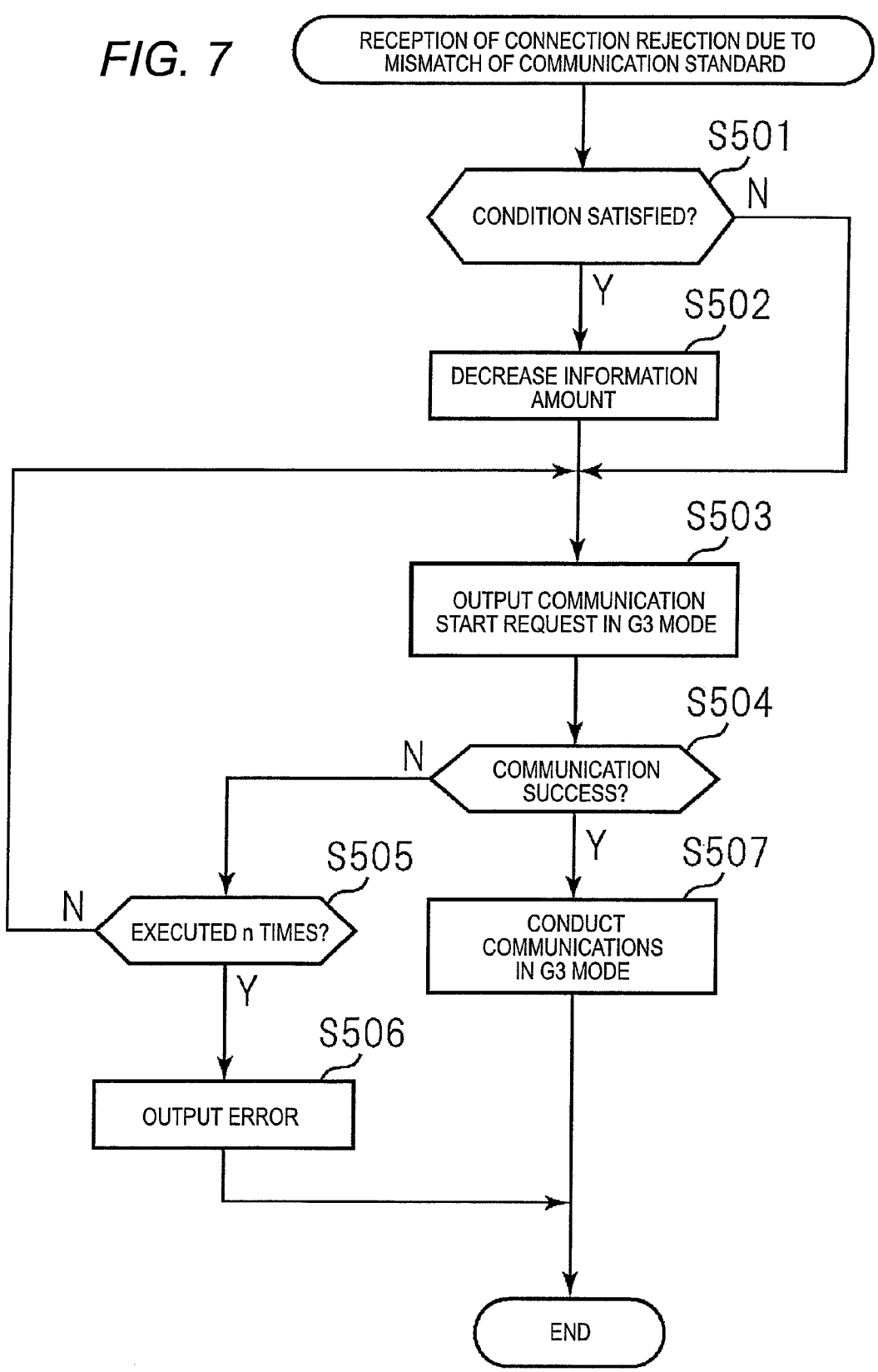

US 8,527,583 B2

COMMUNICATION DEVICE INCLUDING A COMMUNICATION START REQUEST OUTPUT UNIT AND A RESPONSE NOTIFICATION ACCEPTANCE UNIT, COMMUNICATION SYSTEM, AND COMPUTER-READABLE MEDIUM

CROSS-REFERENCE TO RELATED APPLICATION

This application is based on and claims priority under 35 USC 119 from Japanese Patent Application No. 2010-209906 filed on Sep. 17, 2010.

BACKGROUND

1. Technical Field

This invention relates to a communication device, a communication system and a computer-readable medium.

2. Related Art

A communication device for conducting communications according to a communication standard selected from among communication standards exists.

And, communications have been conducted between facsimile machines using a next generation network (NGN) of a base network for providing new information communication service in which fixed communications and mobile communications are merged and telephone, data communications, and streaming broadcast are merged.

SUMMARY

[1] According to an aspect of the invention, a communication device includes a communication start request output unit and a response notification acceptance unit. The communication start request output unit outputs a communication start request to an output destination communication device. The response notification acceptance unit accepts a response notification with respect to the communication start request from the output destination communication device. When the response notification acceptance unit accepts a response notification indicating connection rejection due to a mismatch of a communication standard as the response notification with respect to the output communication start request, the communication start request output unit again outputs the communication start request to the output destination communication device in the communication standard to which the output communication start request conforms.

BRIEF DESCRIPTION OF THE DRAWINGS

Exemplary embodiments of the invention will be described in detail based on the following figures, wherein:

FIG. 7 is a flowchart to show an example of a flow of processing performed by a communication device according to another embodiment of the invention.

DETAILED DESCRIPTION

Figure 1:
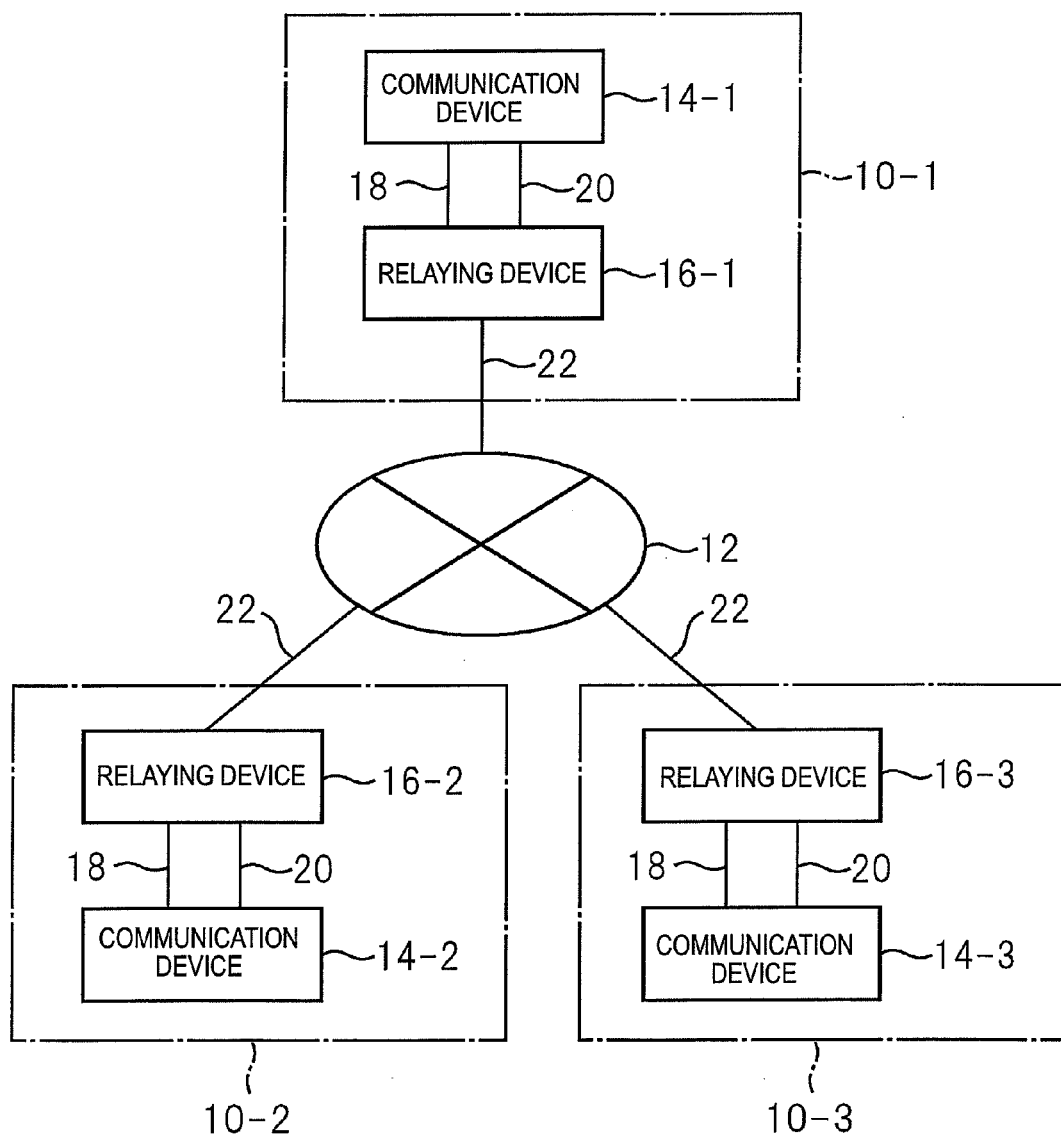
FIG. 1 is a drawing to show an example of the general configuration of an embodiment of the invention.

Embodiments of the invention will be discussed below in detail based on the accompanying drawings:

FIG. 1 is a drawing to show an example of the general configuration of an embodiment of the invention. As illustrated in FIG. 1, a first communication system 10-1, a second communication system 10-2, and a third communication system 10-3 are connected to communication means (in the embodiment, for example, next generation network (NGN) 12) and communicate with each other. The first communication system 10-1 includes a first communication device 14-1 and a first relaying device 16-1; the second communication system 10-2 includes a second communication device 14-2 and a second relaying device 16-2; and a third communication system 10-3 includes a third communication device 14-3 and a third relaying device 16-3.

The communication device 14 is, for example, an IP facsimile machine and is made up of a control section of a program control device of a CPU, etc., operating in accordance with a program installed in the communication device 14, a storage section of storage elements of ROM, RAM, etc., a hard disk drive, etc., a user interface (UI) section of a touch panel, buttons, etc., a read section of a scanner, etc., for reading an image formed on a surface of a sheet, a print section of a printer, etc., for printing a sheet on which an image received from another communication device 14, a digital communication section of a communication interface for digital communications such as a LAN card, and an analog communication section of a communication interface for analog communications such as an analog facsimile communication card. The components are connected through a bus.

The relaying device 16 is, for example, a home gateway device for relaying communications between the communication devices 14 through the NGN 12 and is made up of a control section of a program control device of a CPU, etc., operating in accordance with a program installed in the communication device 14, a storage section of storage elements of ROM, RAM, etc., a hard disk drive, etc., a first port of a communication port used for digital communications with the communication device 14, a second port of a communication port used for analog communications with the communication device 14, and a third port of a communication port used for digital communications with the NGN 12.

The first port of the relaying device 16 and the digital communication section of the communication device 14 are connected by a digital communication cable (in the embodiment, for example, a LAN cable 18). The second port of the relaying device 16 and the analog communication section of the communication device 14 are connected by an analog communication cable (in the embodiment, for example, a modular cable 20). The third port of the relaying device 16 and the NGN 12 are connected by an optical fiber 22 in the embodiment, for example.

Figure 2:
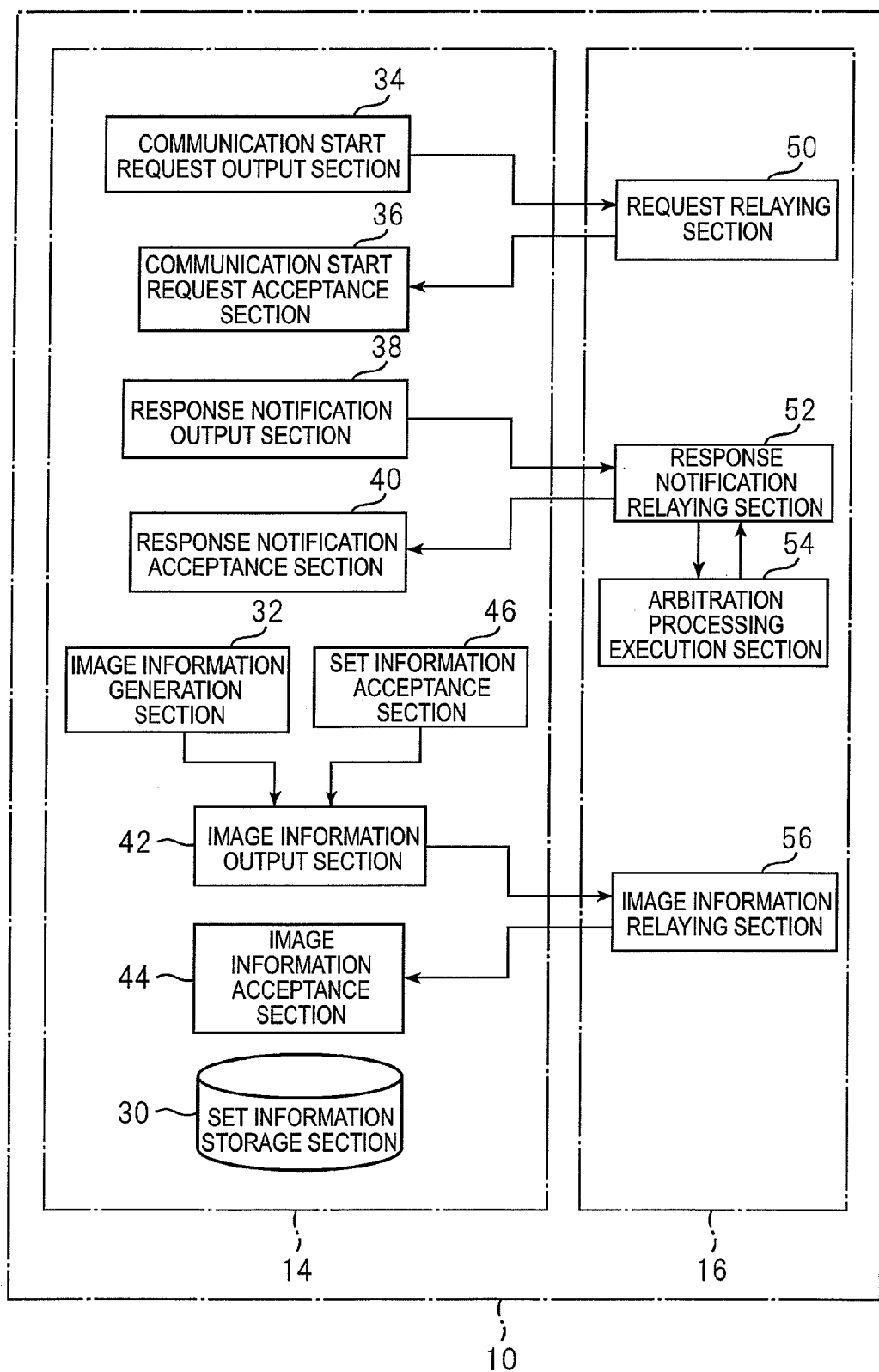
FIG. 2 is a function block diagram to show an example of the function realized by a communication system according to the embodiment of the invention.

FIG. 2 is a function block diagram to show an example of the function realized by the communication system 10 according to the embodiment of the invention. As illustrated in FIG. 2, the communication device 14 includes a set information storage section 30, an image information generation section 32, a communication start request output section 34, a communication start request acceptance section 36, a response notification output section 38, a response notification acceptance section 40, an image information output section 42, an image information acceptance section 44, and a set information acceptance section 46. The set information storage section 30 is implemented mainly as the storage section of the communication device 14. The image information generation section 32 is implemented mainly as the control section and the read section of the communication device 14. Other components are implemented mainly as the control section, the digital communication section, and the analog communication section of the communication device 14. The relaying device 16 includes a request relaying section 50, a response notification relaying section 52, an arbitration processing execution section 54, and an image information relaying section 56. The components are implemented mainly as the control section and the ports of the relaying device 16.

The components are realized as the communication device 14 and the relaying device 16 of computers execute programs installed in the communication device 14 and the relaying device 16. The programs are supplied to the communication device 14 and the relaying device 16, for example, through a computer-readable information storage medium of a CD-ROM, a DVD-ROM, etc., or through communication means of the Internet, etc.

Figure 3:
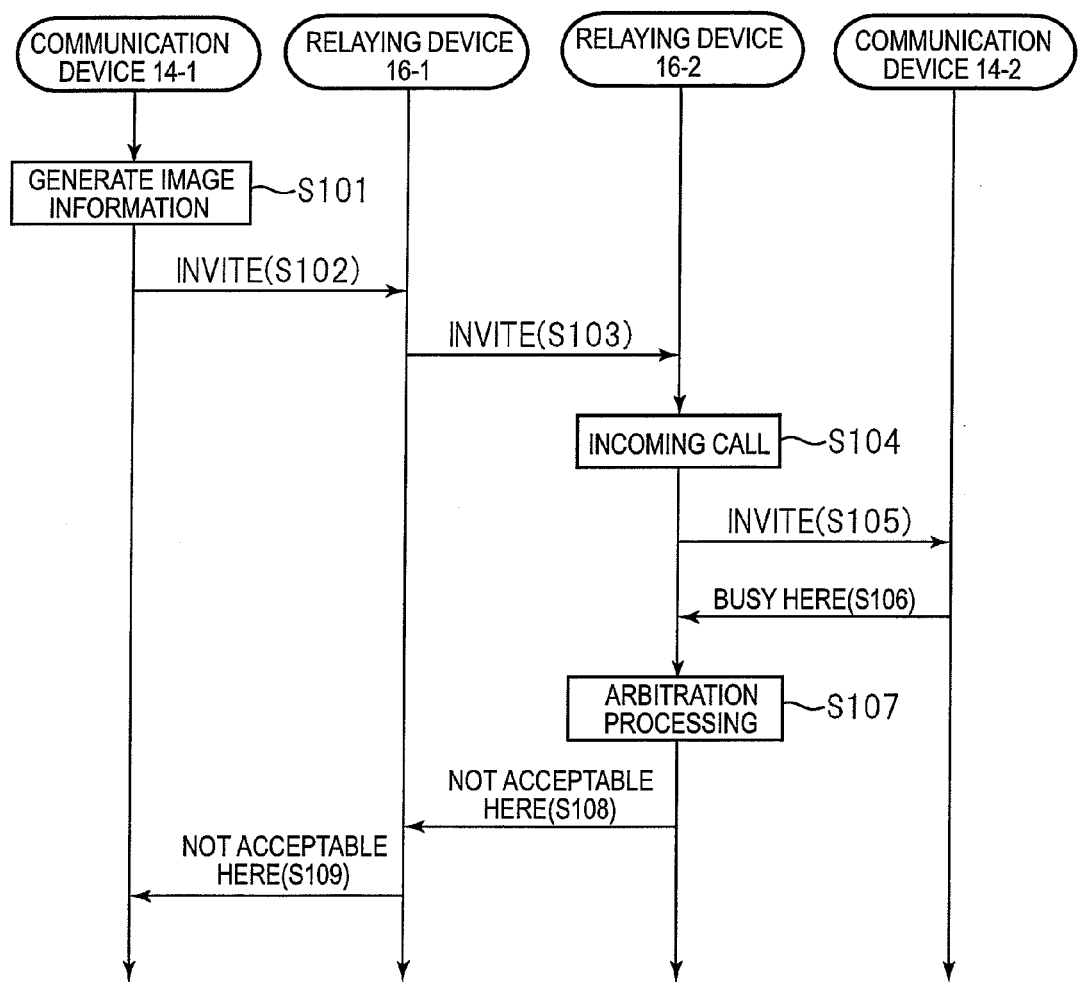
FIG. 3 is a flowchart to show an example of a flow of processing performed by the communication system according to the embodiment of the invention.

An example of a processing flow from transmission of a communication start request to the second communication device 14-2 by the first communication device 14-1 to output of a response notification indicating connection rejection due to a mismatch of a communication standard to the first communication device 14-1 by the second communication device 14-2 when the second communication device 14-2 and the third communication device 14-3 are communicating with each other in the communication system 10 according to the embodiment will be discussed with reference to a flowchart of FIG. 3.

First, the image information generation section 32 of the first communication device 14-1 reads an image on a surface of a sheet and generates image information corresponding to the image (S101). The communication start request output section 34 of the first communication device 14-1 outputs a communication start request in a first communication standard to the second communication device 14-2 (in the processing example, a communication start request (in the processing example, INVITE request in SIP (Session Initiation Protocol)) for requesting start of IP facsimile communications to the second communication device 14-2 (for example, communications based on T.38 protocol) (S102). The request relaying section 50 of the first relaying device 16-1 relays the communication start request so that the communication start request arrives at the second relaying device 16-2 via the NGN 12 (S103).

When the request relaying section 50 of the second relaying device 16-2 accepts the communication start request, the request relaying section 50 places the communication start request in the first port and the second port of the second relaying device 16-2 as an incoming call (S104). Since the first port of the second relaying device 16-2 is a communication port used for digital communications, the request relaying section 50 of the second relaying device 16-2 relays the communication start request from the first port to the second communication device 14-2 (S105). On the other hand, since the second port of the second relaying device 16-2 is a communication port used for analog communications, the second port of the second relaying device 16-2 outputs a response notification indicating connection rejection due to a mismatch of a communication standard (in the processing example, a notification that the value of response code in SIP is 488 (Not Acceptable Here)) to the response notification relaying section 52 of the second relaying device 16-2 without outputting the communication start request to the second communication device 14-2. In the processing example, the response notification indicating connection rejection due to a mismatch of a communication standard indicates a notification containing Warning code 304 (Mediatype not available) indicating a media type match error or Warning code 304 (Incompatible media format) indicating media format incompatibility, of different types of Warning codes of connection rejection.

When the communication start request acceptance section 36 of the second communication device 14-2 accepts the communication start request output from the first port of the second relaying device 16-2, the response notification output section 38 of the second communication device 14-2 outputs a response notification indicating communicating (in the processing example, a response notification that the value of response code in SIP is 486 (Busy Here)) to the first communication device 14-1 based on the fact that the second communication device 14-2 is communicating with the third communication device 14-3. The response notification relaying section 52 of the second relaying device 16-2 accepts the response notification through the first port (S106).

The arbitration processing execution section 54 of the second relaying device 16-2 executes arbitration processing between the response notification indicating communicating accepted by the response notification relaying section 52 from the first port and the response notification indicating connection rejection due to a mismatch of a communication standard accepted by the response notification relaying section 52 from the second port (S107). In the embodiment, the arbitration processing execution section 54 determines that the response notification indicating connection rejection due to a mismatch of a communication standard has higher priority than the response notification indicating communicating, and commands the response notification relaying section 52 of the second relaying device 16-2 to output the response notification indicating connection rejection due to a mismatch of a communication standard to the first communication device 14-1.

The response notification relaying section 52 of the second relaying device 16-2 outputs the response notification indicating connection rejection due to a mismatch of a communication standard (in the processing example, a response notification that the value of response code in SIP is 488 (Not Acceptable Here)) destined for the first communication device 14-1 to the first relaying device 16-1 via the NGN 12 (S108). The response notification relaying section 52 of the first relaying device 16-1 relays the response notification to the first communication device 14-1. The response notification acceptance section 40 of the first communication device 14-1 accepts the response notification through the first port of the first communication device 14-1 (S109).

Thus, in the processing shown in the processing example, the first communication device 14-1 accepts the response notification indicating connection rejection due to a mismatch of a communication standard.

The processing example wherein the second communication device 14-2 and the third communication device 14-3 are communicating with each other is described above. In the processing example described above, if the second communication device 14-2 and the third communication device 14-3 are not communicating with each other, in the processing corresponding to the processing at S106 described above, the response notification output section 38 of the second communication device 14-2 outputs a response notification indicating that communications are acceptable (for example, a notification of definite response that the value of response code in SIP is 200 (OK)) to the first communication device 14-1. The response notification relaying section 52 of the second relaying device 16-2 accepts the response notification through the first port in processing corresponding to the processing at S107 and S108 described above. The second relaying device 16-2 determines that the response notification indicating that communications are acceptable has higher priority than the response notification indicating connection rejection due to a mismatch of a communication standard in arbitration processing, and outputs the response notification indicating that communications are acceptable to the first communication device 14-1. The response notification acceptance section 40 of the first communication device 14-1 accepts the response notification in processing corresponding to the processing at S109 described above.

As described above, in the embodiment, the second communication device 14-2 transmits some response notification to the first communication device 14-1 in response to the communication start request output to the second communication device 14-2 by the first communication device 14-1.

Figure 4:
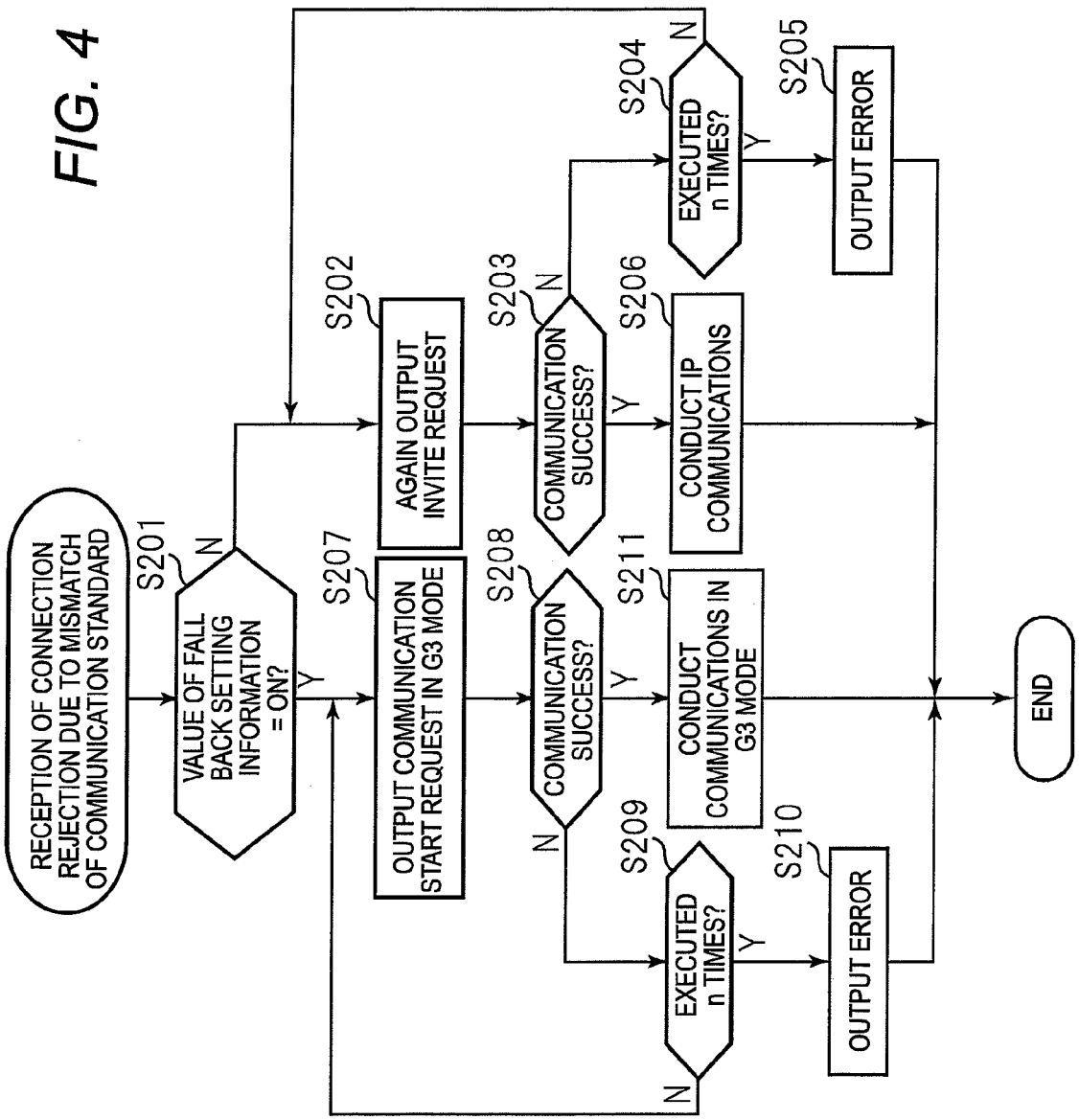
FIG. 4 is a flowchart to show an example of a flow of processing performed by a communication device according to the embodiment of the invention.

An example of a flow of processing performed by the first communication device 14-1 when the first communication device 14-1 accepts the response notification indicating connection rejection due to a mismatch of a communication standard according to the processing at S101 to S109 described above will be discussed with reference to a flowchart of FIG. 4.

In the processing example, fall back setting information indicating whether or not to switch the communication standard used in communications with the second communication device 14-2 when a communication start request is again output is previously stored in the set information storage section 30. The value of the fall back setting information is ON or OFF.

First, the communication start request output section 34 of the first communication device 14-1 acquires the fall back setting information stored in the set information storage section 30 and checks whether or not the value is ON (S201). If the value is OFF (N at S201), the communication start request output section 34 of the first communication device 14-1 again outputs a communication start request for requesting the second communication device 14-2 to start IP facsimile communications (in the processing example, INVITE request in SIP) in the first communication standard as in the communications in the processing at S102 described above (in the processing example, digital communications based on T.38 protocol according to Internet protocol) (S202).

The response notification acceptance section 40 of the first communication device 14-1 accepts the response notification output from the second communication device 14-2 and checks whether or not the response notification is a response notification indicating that communications are acceptable (for example, notification of definite response that the value of response code in SIP is 200 (OK)) (namely, communications end in success) (S203). If it is checked that communications do not end in success (N at S203), the communication start request output section 34 of the first communication device 14-1 checks whether or not the processing at 5202 described above has been already executed a predetermined number of times (for example, n times) (S204).

If it is checked that the number of execution times is less than n times (N at S204), the processing at S202 described above is again executed. If it is checked that the number of execution times is n times (Y at S204), the communication start request output section 34 of the first communication device 14-1 outputs a message to the effect that the communications become an error to a display, etc., of the first communication device 14-1 (S205) and terminates the processing shown in the processing example.

If it is checked at 5203 that communications end in success (Y at S203), the first communication device 14-1 conducts communications with the second communication device 14-2 according to the Internet protocol (S206). At 5206, for example, the image information output section 42 of the first communication device 14-1 transmits image information to be transmitted to the second communication device 14-2. Then, the image information relaying section 56 of the first relaying device 16-1 and the image information relaying section 56 of the second relaying device 16-2 relay the image information. The image information acceptance section 44 of the second communication device 14-2 accepts the image information. The processing shown in the processing example is terminated.

If it is checked at S201 that the value of the fall back setting information is ON (Y at S201), the communication start request output section 34 of the first communication device 14-1 outputs a communication start request to the second communication device 14-2 via the modular cable 20 according to a second communication standard different from that in the communications in the processing at S102 described above (in the processing example, analog communications in G3 mode based on T.30 protocol) (S207). The communication start request arrives at the second communication device 14-2 via the first relaying device 16-1, the NGN 12, the second relaying device 16-2, and the modular cable 20. The second communication device 14-2 outputs a response notification to the first communication device 14-1. The response notification acceptance section 40 of the first communication device 14-1 accepts the response notification output from the second communication device 14-2 via the modular cable 20 and checks whether or not the response notification is a response notification indicating that communications are acceptable (namely, communications end in success) (S208). If it is checked that communications do not end in success (N at S208), the communication start request output section 34 of the first communication device 14-1 checks whether or not the processing at S207 described above has been already executed a predetermined number of times (for example, n times) (S209).

If it is checked that the number of execution times is less than n times (N at S209), the first communication device 14-1 again executes the processing at S207 described above. If it is checked that the number of execution times is n times (Y at S209), the communication start request output section 34 of the first communication device 14-1 outputs a message to the effect that the communications become an error to the display, etc., of the first communication device 14-1 (S210) and terminates the processing shown in the processing example.

If it is checked at S208 that communications end in success (Y at S208), the first communication device 14-1 conducts communications with the second communication device 14-2 in the G3 mode (S211). At S211, for example, the image information output section 42 of the first communication device 14-1 transmits image information to be transmitted to the second communication device 14-2. Then, the image information relaying section 56 of the first relaying device 16-1 and the image information relaying section 56 of the second relaying device 16-2 relay the image information. The image information acceptance section 44 of the second communication device 14-2 accepts the image information. The processing shown in the processing example is terminated.

The set information storage section 30 may store set information indicating whether to output a communication start request in digital communications or output a communication start request in analog communications when the first communication device 14-1 accepts the response notification indicating connection rejection due to a mismatch of a communication standard according to the processing at S101 to S109 described above, for example, in place of the fall back setting information. At S201, the communication start request output section 34 of the first communication device 14-1 may check setting of the set information. If output of a communication start request in digital communications is set in the set information, the first communication device 14-1 may execute processing at S202 and the later described above; if output of a communication start request in analog communications is set in the set information, the first communication device 14-1 may execute processing at S207 and the later described above.

In the set information, output of a communication start request in digital communications or output of a communication start request in analog communications may be set for each abbreviated dialing ID. When the first communication device 14-1 accepts the abbreviated dialing ID associated with the facsimile number of a called party from the user and transmits a communication start request to the communication device 14 corresponding to the abbreviated dialing ID, execution of the processing at S202 and the later described above and execution of the processing at S207 and the later described above may be switched in response to the value of the abbreviated dialing ID.

When the first communication device 14-1 accepts the response notification indicating connection rejection due to a mismatch of a communication standard according to the processing at S101 to S109 described above, the set information acceptance section 46 of the first communication device 14-1 may display a pop-up screen for selecting output of a communication start request in digital communications or output of a communication start request in analog communications on the touch panel, etc. The set information acceptance section 46 of the first communication device 14-1 may accept selection of digital communications or analog communications from the user. When the first communication device 14-1 accepts the response notification indicating connection rejection due to a mismatch of a communication standard, the first communication device 14-1 may switch execution of the processing at 5202 and the later described above and execution of the processing at S207 and the later described above in response to the accepted setting.

Figure 5:
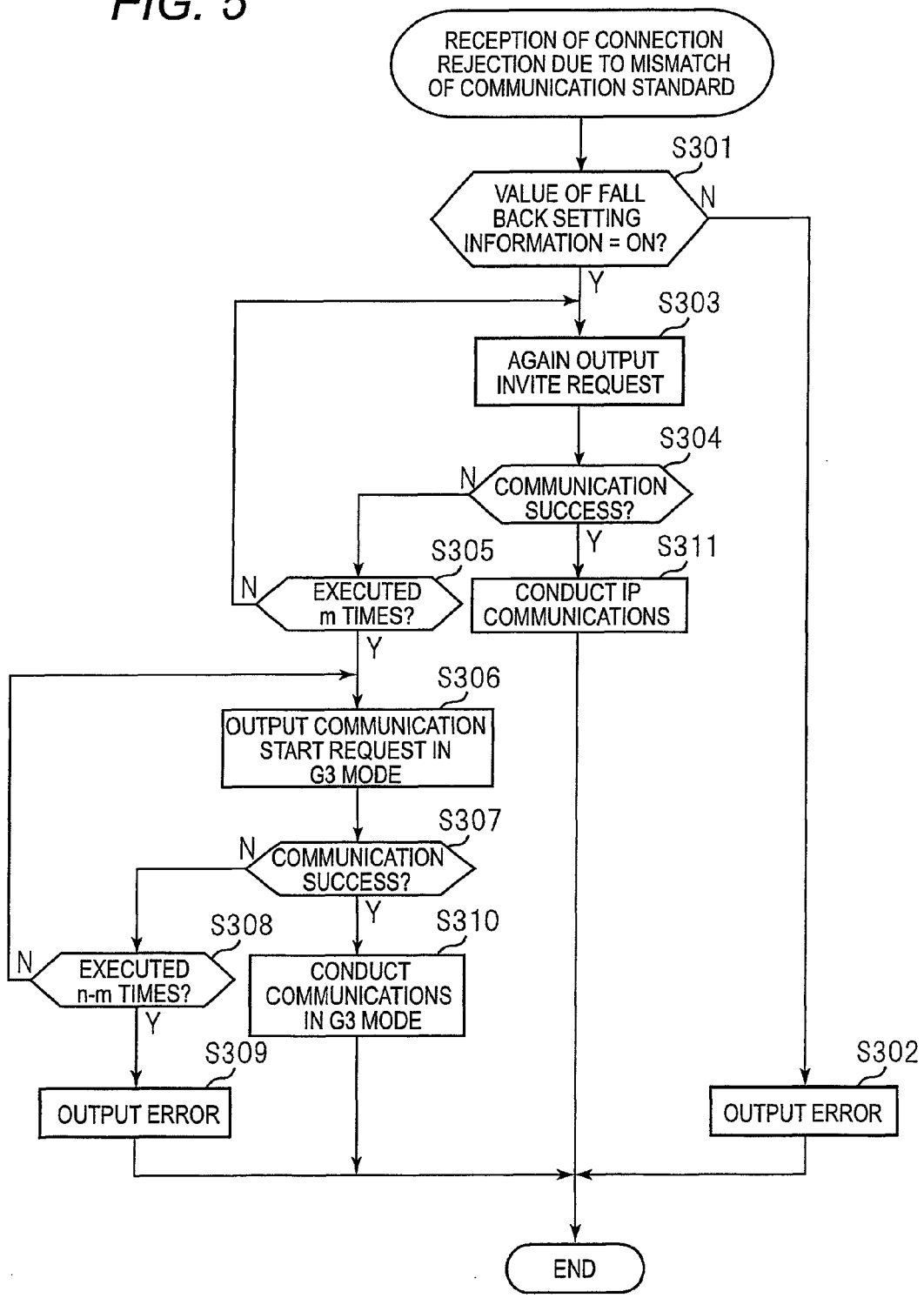
FIG. 5 is a flowchart to show a first modified example of the flow of the processing shown in FIG. 4.

Next, a first modified example of the processing flow shown in FIG. 4 will be discussed with reference to a flowchart of FIG. 5. In the processing example, the fall back setting information is also previously stored in the set information storage section 30.

First, the communication start request output section 34 of the first communication device 14-1 acquires the fall back setting information stored in the set information storage section 30 and checks whether or not the value is ON (S301). If the value is OFF (N at S301), the communication start request output section 34 of the first communication device 14-1 displays output to the effect that the communications become an error on the display, etc., of the first communication device 14-1 (S302) and terminates the processing shown in the processing example.

If the value is ON (Y at S301), the communication start request output section 34 of the first communication device 14-1 again outputs a communication start request for requesting the second communication device 14-2 to start IP facsimile communications in the first communication standard as in the communications in the processing at S102 described above (S303). The response notification acceptance section 40 of the first communication device 14-1 checks whether or not communications end in success (S304). If it is checked that communications do not end in success (N at S304), the communication start request output section 34 of the first communication device 14-1 checks whether or not the processing at S304 described above has been already executed a predetermined number of times (for example, m times) (S305).

If it is checked that the number of execution times is less than m times (N at S305), the first communication device 14-1 again executes the processing at S303 described above. If it is checked that the number of execution times is m times (Y at S305), the communication start request output section 34 of the first communication device 14-1 outputs a communication start request to the second communication device 14-2 via the modular cable 20 according to the second communication standard different from that in the communications in the processing at S102 described above (S306). The response notification acceptance section 40 of the first communication device 14-1 accepts the response notification output from the second communication device 14-2 via the modular cable 20 and checks whether or not the response notification is a response notification indicating that communications are acceptable (namely, communications end in success) (S307). If it is checked that communications do not end in success (N at S307), the communication start request output section 34 of the first communication device 14-1 checks whether or not the total of the number of execution times of the processing at 5303 described above and the number of execution times of the processing at S306 described above reaches a predetermined number of times (for example, n times) (namely, whether or not the number of execution times of the processing at S306 describes above reaches n-m times) (S308).

If it is checked that the total does not reach the predetermined number of times (N at S308), the first communication device 14-1 again executes the processing at 5306 described above. If it is checked that the total reaches the predetermined number of times (Y at S308), the communication start request output section 34 of the first communication device 14-1 displays output to the effect that the communications become an error on the display, etc., of the first communication device 14-1 (S309) and terminates the processing shown in the processing example.

If it is checked at S307 that the communications end in success (Y at S307), analog communications in the G3 mode are conducted between the first communication device 14-1 and the second communication device 14-2 (S310). The processing shown in the processing example is terminated.

If it is checked at S304 that the communications end in success (Y at S304), communications according to the Internet protocol are conducted between the first communication device 14-1 and the second communication device 14-2 (S311). The processing shown in the processing example is terminated.

Figure 6:
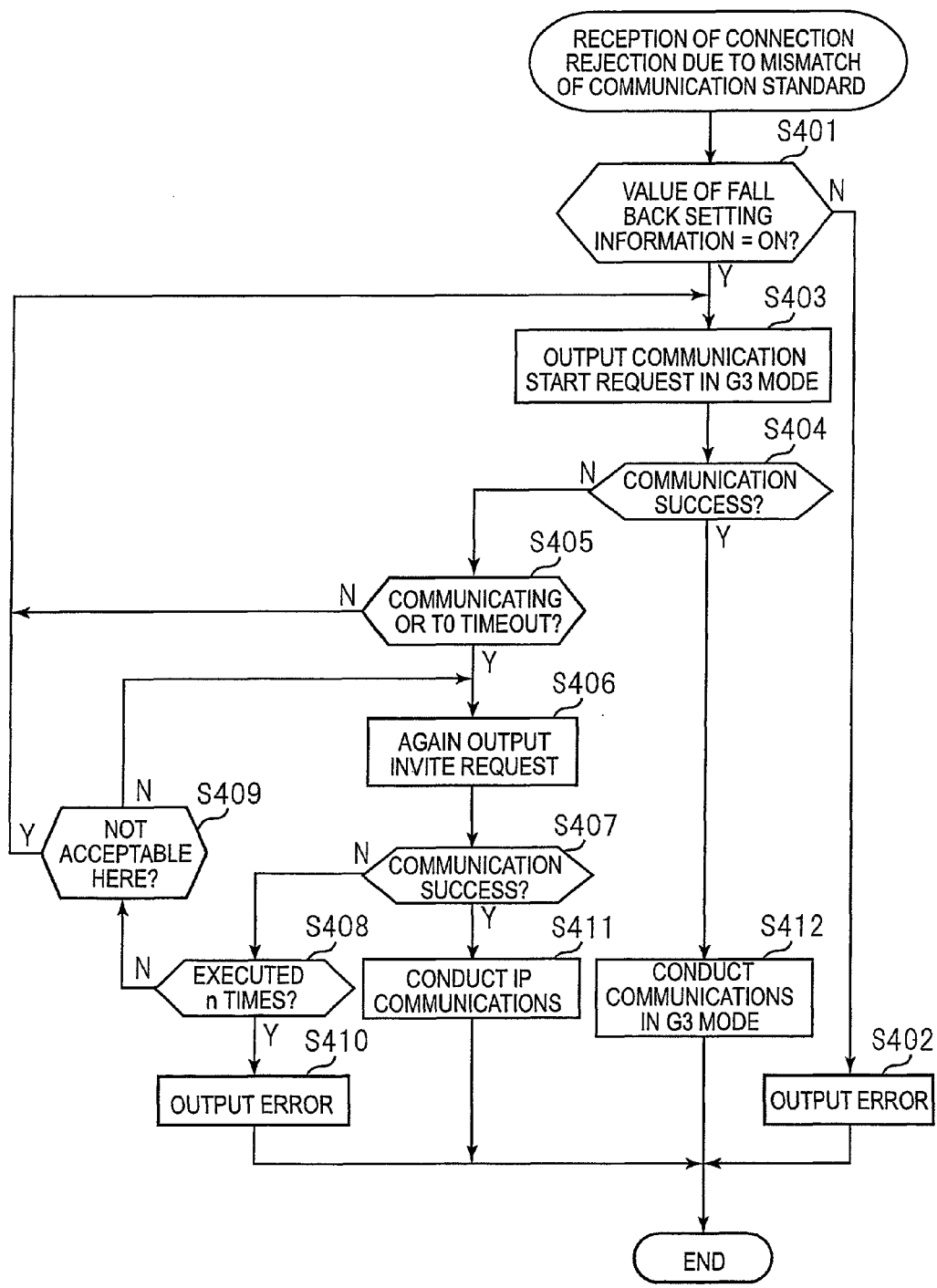
FIG. 6 is a flowchart to show a second modified example of the flow of the processing shown in FIG. 4.

Next, a second modified example of the processing flow shown in FIG. 4 will be discussed with reference to a flowchart of FIG. 6. In the processing example, the fall back setting information is also previously stored in the set information storage section 30.

First, the communication start request output section 34 of the first communication device 14-1 acquires the fall back setting information stored in the set information storage section 30 and checks whether or not the value is ON (S401). If the value is OFF (N at S401), the communication start request output section 34 of the first communication device 14-1 displays output to the effect that the communications become an error on the display, etc., of the first communication device 14-1 (S402) and terminates the processing shown in the processing example.

If the value is ON (Y at S401), the communication start request output section 34 of the first communication device 14-1 outputs a communication start request to the second communication device 14-2 via the modular cable 20 according to the second communication standard different from that in the communications in the processing at S102 described above (S403). The response notification acceptance section 40 of the first communication device 14-1 accepts the response notification output from the second communication device 14-2 via the modular cable 20 and checks whether or not the response notification is a response notification indicating that communications are acceptable (namely, communications end in success) (S404). If it is checked that communications do not end in success (N at S404), the communication start request output section 34 of the first communication device 14-1 checks whether or not a condition that response notification indicating that the second communication device 14-2 is communicating or a condition that when a predetermined wait time T0 has elapsed, response notification from the second communication device 14-2 does not arrive at the first communication device 14-1 (T0 timeout) is satisfied (S405).

If the condition at 5405 is not satisfied (N at S405), the first communication device 14-1 again executes the processing at 5403 described above. If the condition at S405 is satisfied (Y at S405), the communication start request output section 34 of the first communication device 14-1 again outputs a communication start request for requesting the second communication device 14-2 to start IP facsimile communications in the first communication standard as in the communications in the processing at S102 described above (S406). The response notification acceptance section 40 of the first communication device 14-1 accepts the response notification output from the second communication device 14-2 and checks whether or not communications end in success (S407). If it is checked that communications do not end in success (N at S407), the communication start request output section 34 of the first communication device 14-1 checks whether or not the processing at S406 described above has been already executed a predetermined number of times (for example, n times) (S408).

If it is checked that the number of execution times is less than n times (N at S408), the communication start request output section 34 of the first communication device 14-1 checks whether or not the response notification accepted by the response notification acceptance section 40 of the first communication device 14-1 in the processing at S407 described above is a response notification indicating connection rejection due to a mismatch of a communication standard (in the processing example, a notification that the value of response code in SIP is 488 (Not Acceptable Here)) (S409). If the response notification is a response notification indicating connection rejection due to a mismatch of a communication standard (Y at S409), the first communication device 14-1 executes the processing at S403 described above; otherwise (N at S409), the first communication device 14-1 executes the processing at S406 described above.

If it is checked at S408 that the number of execution times is n times (Y at S408), the communication start request output section 34 of the first communication device 14-1 displays output to the effect that the communications become an error on the display, etc., of the first communication device 14-1 (S410) and terminates the processing shown in the processing example.

If it is checked at S407 that the communications end in success (Y at S407), communications according to the Internet protocol are conducted between the first communication device 14-1 and the second communication device 14-2 (S411). The processing shown in the processing example is terminated.

If it is checked at S404 that the communications end in success (Y at S404), the first communication device 14-1 conducts analog communications in the G3 mode with the second communication device 14-2 (S412). The processing shown in the processing example is terminated.

The invention is not limited to the embodiment described above. Another embodiment of the invention will be discussed below:

An example of the general configuration of the embodiment is similar to the configuration shown in FIG. 1. A function block diagram to show an example of the function realized by a communication system 10 according to the embodiment is similar to the function block diagram of FIG. 2.

A set information acceptance section 46 of a first communication device 14-1 according to the embodiment also accepts settings concerning transmission of image information (for example, setting of resolution (for example, any of 200×100 dpi, 200×200 dpi, 200×400 dpi, or 200×600 dpi) and setting of document type (for example, any of text, photo, or color), etc.,) from the user in the processing at S101 described above. An image information generation section 32 of the first communication device 14-1 generates image information according to the settings in the processing at S101 described above.

An example of a flow of processing in the embodiment corresponding to the processing at S201 to 5211 described above will be discussed with reference to a flowchart of FIG. 7. In the processing example, a set information storage section 30 previously stores image setting condition information indicating the condition concerning the settings (for example, condition corresponding to at least either of "color" or "photo" as the setting of the document type and 200×600 dpi (compatible with ultra high resolution) as the setting of the resolution).

First, a communication start request output section 34 of the first communication device 14-1 acquires the image setting condition information stored in the set information storage section 30 and checks whether or not the setting concerning transmission of image information accepted from the user satisfies the condition indicated by the image setting condition information (S501). If the condition is satisfied (Y at S501), the communication start request output section 34 of the first communication device 14-1 converts resolution into lower resolution by image compression, performs monochromatization, etc., for example, thereby decreasing the information amount of the image information to be transmitted (S502). After the processing at S502 terminates or if it is checked at S501 that the condition is not satisfied (N at S501), the communication start request output section 34 of the first communication device 14-1 outputs a communication start request to a second communication device 14-2 via a modular cable 20 according to a second communication standard different from that of communications in the processing at S102 described above (S503). A response notification acceptance section 40 of the first communication device 14-1 accepts a response notification output from the second communication device 14-2 via the modular cable 20 and checks whether or not communications end in success (S504). If it is checked that communications do not end in success (N at S504), the communication start request output section 34 of the first communication device 14-1 checks whether or not the processing at S503 described above has been already executed a predetermined number of times (for example, n times) (S505).

If it is checked that the number of execution times is less than n times (N at S505), the processing at S503 described above is again executed. If it is checked that the number of execution times is n times (Y at S505), the communication start request output section 34 of the first communication device 14-1 displays output to the effect that the communications become an error on a display, etc., of the first communication device 14-1 (S506) and terminates the processing shown in the processing example.

If it is checked at 5504 that the communications end in success (Y at S504), the first communication device 14-1 conducts analog communications in the G3 mode with the second communication device 14-2 (S507). At 5507, for example, the image information output section 42 of the first communication device 14-1 transmits image information to be transmitted (if the processing at S502 is executed, image information whose amount has been decreased) to the second communication device 14-2. Then, an image information relaying section 56 of a first relaying device 16-1 and an image information relaying section 56 of a second relaying device 16-2 relay the image information. An image information acceptance section 44 of the second communication device 14-2 accepts the image information. The processing shown in the processing example is terminated.

In the processing example, if it is determined at S501 that the condition is satisfied, the first communication device 14-1 may execute the processing at S202 to S206 described above in place of the processing at 5502 to S507 described above. For example, if it is determined at S501 that the condition is not satisfied, the first communication device 14-1 may execute the processing at S207 to S211 described above in place of the processing at S503 to 5507 described above.

In the processing example, the set information acceptance section 46 of the first communication device 14-1 may accept selection of giving priority to the image quality or charge from the user through a pop-up screen displayed on a touch panel. The first communication device 14-1 may generate priority setting information indicating either image quality priority or charge priority and may store the information in the set information storage section 30. If it is determined at S501 that the condition is satisfied, the communication start request output section 34 of the first communication device 14-1 may execute the processing at S502 described above if charge priority is set in the priority setting information; may execute the processing at S503 and the later without executing the processing at S502 described above if image quality priority is set in the priority setting information.

The invention is not limited to the embodiment either.

For example, in the processing at S101 described above, the set information acceptance section 46 of the first communication device 14-1 may accept information indicating settings concerning transmission of image information in digital communications (for example, setting of resolution (for example, any of 200×100 dpi, 200×200 dpi, 200×400 dpi, or 200×600 dpi), setting of document type (for example, any of text, photo, or color), etc.,), and information indicating settings concerning transmission of image information in analog communications from the user. For example, in processing corresponding to the processing at S109 described above, if the response notification acceptance section 40 of the first communication device 14-1 accepts a response notification indicating that communications are acceptable, the first communication device 14-1 may transmit image information according to the setting concerning transmission of image information in digital communications to the second communication device 14-2. In processing corresponding to the processing at S109 described above, if the response notification acceptance section 40 of the first communication device 14-1 accepts a predetermined response notification which becomes a re-transmission target, the first communication device 14-1 may repeatedly execute the processing at S102 and the later described above within a predetermined number of times (for example, n times). In processing corresponding to the processing at S109 described above, if the response notification acceptance section 40 of the first communication device 14-1 accepts a response notification indicating connection rejection due to a mismatch of a communication standard, the first communication device 14-1 may execute processing similar to the processing at S208 to S211 described above. At this time, when executing processing corresponding to the processing at S211 described above, the first communication device 14-1 may transmit image information according to the setting concerning transmission of image information in analog communications indicated by the information accepted from the user to the second communication device 14-2.

The set information storage section 30 may previously store information indicating default setting concerning transmission of image information in digital communications and information indicating default setting concerning transmission of image information in analog communications. If the first communication device 14-1 does not accept at least one of information indicating the setting concerning transmission of image information in digital communications and information indicating the setting concerning transmission of image information in analog communications, the first communication device 14-1 may transmit image information according to the default setting indicated by the information stored in the set information storage section 30 to the second communication device 14-2.

For example, the embodiment described above may be applied to a scene where information is transferred between the communication devices 14 according to any other protocol than SIP (for example, H.323, MGCP, etc.,). The embodiment may be applied to communications between the communication systems 10 connected to communication means different from the NGN 12 (for example, a LAN, the internet, etc.,). The embodiment may be applied to any other device than the facsimile machine (for example, a telephone, a stream distribution device, etc.,). For example, the LAN cable 18 connected to the digital communication section of the communication device 14 may be connected to an IP network of the Internet, etc., and the modular cable 20 connected to the analog communication section of the communication device 14 may be connected to a public telephone exchange line network.

The specific numeric values and the character strings described above are for illustrative purposes only and the invention is not limited to the numeric values or the character strings.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication device comprising:
at least one hardware processor which executes:
a communication start request output unit that outputs a first communication start request in a communication standard to an output destination communication device; and
a response notification acceptance unit that accepts a notification with respect to the first communication start request on a basis of a response notification output from a relaying device, wherein
when the response notification acceptance unit accepts the notification indicating connection rejection with respect to the first communication start request, the communication start request output unit outputs a second communication start request to the output destination communication device in another communication standard, which is different from the communication standard of the first communication start request, and
if the response notification acceptance unit accepts the notification indicating communicating with respect to the second communication start request, or the response notification acceptance unit does not accept the notification to the second communication start request when a predetermined time has elapsed, the communication start request output unit outputs a third communication start request to the output destination communication device in the communication standard of the first communication start request.

2. The communication device according to claim 1, further comprising:
a set information acceptance unit that accepts set information representing setting as to whether or not to output the second communication start request in the communication standard if the notification indicates the connection rejection with respect to the output first communication start request, wherein
if the set information represents outputting the second communication start request in the communication standard when the response notification acceptance unit accepts the notification indicating the connection rejection with respect to the output first communication start request, the communication start request output unit outputs another communication start request to the output destination communication device in the communication standard.

3. The communication device according to claim 1, wherein
when the response notification acceptance unit accepts the notification indicating the connection rejection with respect to the output first communication start request, and
if information to be output to the output destination communication device satisfies a predetermined condition, the communication start request output unit outputs the second communication start request in the communication standard, and
if the information does not satisfy the predetermined condition, the communication start request output unit outputs the second communication start request in another communication standard, which is different from the communication standard.

4. The communication device according to claim 1, wherein if the response notification acceptance unit accepts the notification indicating that communications with the output destination communication device is acceptable with respect to the second communication start request, an information output unit compresses information in the communication standard, and outputs the compressed information in the another communication standard, which is different from the communication standard.

5. A non-transitory computer-readable medium storing a program that causes a computer to execute communication processing, the communication processing comprising:
outputting a first communication start request in a communication standard to an output destination communication device;
accepting a notification with respect to the first communication start request on a basis of a response notification output from a relaying device;
outputting a second communication start request to the output destination communication device in another communication standard, which is different from the communication standard when the accepted notification indicates connection rejection with respect to the first communication start request; and
compressing information in the communication standard, and outputting the compressed information in the another communication standard, which is different from the communication standard if the accepted notification indicating that communications with the output destination communication device is acceptable.

6. A communication device comprising:
at least one hardware processor which executes:
a communication start request that outputs a first communication start request in a first communication standard to an output destination communication device; and
a response notification acceptance unit that accepts a notification with respect to the first communication start request on a basis of a response notification output from a relaying device, wherein
when the response notification acceptance unit accepts the notification indicating connection rejection with respect to the first communication start request, the communication start request output unit outputs a second communication start request to the output destination communication device in a second communication standard, which is different from the first communication standard of the first communication start request, and
when the response notification unit accepts unit accepts the notification indicating that communications with the output destination communication device is acceptable with respect to the second communication start request, an information output unit compresses information in the first communication standard, and outputs the compressed information in the second communication standard, which is different from the first communication standard.

* * * * *